United States Patent
Kim et al.

(10) Patent No.: US 10,954,370 B2
(45) Date of Patent: Mar. 23, 2021

(54) EMULSION AND PREPARING METHOD THEREFOR

(71) Applicant: HANWHA CHEMICAL CORPORATION, Seoul (KR)

(72) Inventors: Hee Yun Kim, Daejeon (KR); Tae Hoon Yeum, Daejeon (KR); Su Jin Lee, Daejeon (KR); Dae Won Cho, Seoul (KR); Jeong Hyun Choi, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

(21) Appl. No.: 16/474,116

(22) PCT Filed: Jan. 29, 2018

(86) PCT No.: PCT/KR2018/001225
§ 371 (c)(1),
(2) Date: Jun. 27, 2019

(87) PCT Pub. No.: WO2018/143623
PCT Pub. Date: Aug. 9, 2018

(65) Prior Publication Data
US 2019/0352493 A1  Nov. 21, 2019

(30) Foreign Application Priority Data

Feb. 1, 2017 (KR) .................. 10-2017-0014300

(51) Int. Cl.
| | | |
|---|---|---|
| *C09D 125/14* | (2006.01) | |
| *C08K 5/098* | (2006.01) | |
| *C08F 212/08* | (2006.01) | |
| *C08L 25/14* | (2006.01) | |
| *C09D 5/02* | (2006.01) | |

(52) U.S. Cl.
CPC .............. *C08L 25/14* (2013.01); *C09D 5/022* (2013.01); *C09D 125/14* (2013.01); *C08L 2201/52* (2013.01); *C08L 2207/53* (2013.01)

(58) Field of Classification Search
CPC ......... C08J 3/16; C08J 3/126; C08J 2325/06; C08J 2333/08; C08J 3/03; C08L 25/14; C08L 33/08; C08L 33/10; C08L 2207/53; C08L 2201/52; C08L 2201/052; C08F 212/08; C08F 2/22; C08F 285/00; C08F 265/06; C08F 220/14; C09D 5/022; C09D 215/14; C09D 133/062; C09D 5/024; C09D 7/63; C09D 125/14; C09D 5/027; C09D 7/45; C08K 5/09
USPC ........................................................ 523/201
See application file for complete search history.

(56) References Cited

U.S. PATENT DOCUMENTS

| | | | |
|---|---|---|---|
| 5,434,215 A | 7/1995 | Sankaran et al. | |
| 7,195,820 B2 | 3/2007 | Hong et al. | |
| 9,068,036 B2 | 6/2015 | Navarro et al. | |
| 2006/0122318 A1 | 6/2006 | Jho et al. | |
| 2008/0207774 A1 | 8/2008 | Krishnan | |
| 2008/0207831 A1 | 8/2008 | Feinberg | |
| 2008/0233062 A1 | 9/2008 | Krishnan | |
| 2009/0326142 A1* | 12/2009 | Agnely | C09D 151/003 524/523 |
| 2014/0087152 A1 | 3/2014 | Nakamura et al. | |
| 2017/0204261 A1 | 7/2017 | Lee et al. | |
| 2019/0330427 A1* | 10/2019 | Choi | C08L 33/10 |
| 2019/0367741 A1* | 12/2019 | Cho | C08F 257/02 |

FOREIGN PATENT DOCUMENTS

| | | |
|---|---|---|
| CN | 1477134 A | 2/2004 |
| CN | 1763112 A | 4/2006 |
| CN | 104594121 A | 5/2015 |
| CN | 105384864 A | 3/2016 |
| JP | H0197298 A | 4/1989 |
| JP | 2005171253 A | 6/2005 |
| KR | 1020000046302 A | 7/2000 |
| KR | 1020050105861 A | 11/2005 |
| KR | 1020120067319 A | 6/2012 |
| KR | 1020160008418 A | 1/2016 |

OTHER PUBLICATIONS

International Search Report issued in PCT/KR2018/001225 dated Jun. 8, 2018, 9 pages.
Chinese Office Action issued in Chinese Patent Application No. 201860008688.X, dated Dec. 3, 2020, 8 pages.
Korean Grant of Patent issued in Korean Application No. 10-2017-0014300, dated Jan. 28, 2021 with translation, 4 pages.

\* cited by examiner

*Primary Examiner* — Hannah J Pak
(74) *Attorney, Agent, or Firm* — RatnerPrestia

(57) ABSTRACT

An emulsion, and a method of preparing an emulsion are provided. The emulsion includes styrene/acrylic latex particles and a metal stearate-based material.

2 Claims, 1 Drawing Sheet

US 10,954,370 B2

EMULSION AND PREPARING METHOD THEREFOR

CROSS REFERENCE TO RELATED APPLICATIONS

This application is the U.S. National Phase Application of PCT/KR2018/001225, filed Jan. 29, 2018, which claims priority to Korean Patent Application No. 10-2017-0014300, filed Feb. 1, 2017, the contents of such applications being incorporated by reference herein.

TECHNICAL FIELD

The present disclosure relates to an emulsion and a method of preparing the same, and more particularly to a styrene/acrylic emulsion having improved sandability and a method of preparing the same.

BACKGROUND ART

As a method for protecting a surface of a substrate such as paper, film, wood, iron, etc., there is a method of coating the substrate surface. By forming a coating film including a base coat and a top coat on a substrate surface, the substrate surface may be prevented from being directly damaged due to scratches, and penetration of various liquid substances, such as water and alcohols, into the inside of the substrate may be prevented. Further, a beautiful appearance and a smooth touch may be imparted to the substrate.

A composition for the base coat and/or the top coat is required to have coating properties, such as superior adhesion to a substrate and superior film properties, and durability such as high hardness and chemical resistance. In addition, to increase the quality of a coating film, the composition for a base coat and/or a top coat is required to have superior sandability.

DISCLOSURE OF THE INVENTION

Technical Problem

As one method of increasing the sandability of a composition for a base coat and/or a top coat, a method of adding a silicone-based additive capable of increasing sandability to a coating solution may be considered. However, as the content of a silicone-based additive is increased to impart sufficient sandability, transparency and gloss of a coating film may be decreased. In addition, since a problem due to insufficient dispersion, such as generation of craters on a coated surface, may occur when a silicone-based additive is added to a prepared coating solution, the silicone-base additive should be diluted with water or there is a limit to satisfying a demanding dispersion.

Accordingly, it is an object of the present disclosure to provide an emulsion having superior sandability.

It is another object of the present disclosure to provide a method of preparing the emulsion having superior sandability.

It should be noted that objects of the present disclosure are not limited to the above-described objects, and other objects of the present disclosure will be apparent to those skilled in the art from the following description.

Technical Solution

According to an aspect of the present disclosure, the above and other objects can be accomplished by the provision of an emulsion, comprising styrene/acrylic latex particles; and a metal stearate-based material.

The styrene/acrylic latex particles may comprise a core portion comprising a polymer matrix derived from an unsaturated ethylenic monomer; and a shell portion which surrounds the core portion, and at least a portion of the metal stearate-based material may be dispersed inside the shell portion.

Also, the metal stearate-based material may comprise one or more of zinc stearate, aluminum stearate, sodium stearate, magnesium stearate, and calcium stearate.

Also, the metal stearate-based material may be comprised in an amount of 1.0 to 2.5% by weight based on a total weight of the emulsion.

According to another aspect of the present disclosure, there is provided a method of preparing an emulsion, the method comprising preparing an aqueous alkaline medium comprising an alkali-soluble resin dissolved therein; adding a metal stearate-based material to the aqueous alkaline medium; adding an unsaturated ethylenic monomer to the aqueous alkaline medium; and emulsion-polymerizing the unsaturated ethylenic monomer in a state in which the metal stearate-based material is added.

The adding of the unsaturated ethylenic monomer may be performed after the adding of the metal stearate-based material, and between the adding of the metal stearate-based material and the adding of the unsaturated ethylenic monomer, stirring the aqueous alkaline medium comprising the metal stearate-based material added thereto may be further comprised.

Also, the method may further include heating the aqueous alkaline medium between the stirring of the aqueous alkaline medium and the adding of the unsaturated ethylenic monomer, wherein, in the adding of the metal stearate-based material, a temperature of the aqueous alkaline medium may be 45 to 60° C., and in the adding of the unsaturated ethylenic monomer, a temperature of the aqueous alkaline medium may be 70 to 90° C.

Also, the method may further include adding an initiator to the aqueous alkaline medium, wherein an addition amount of the metal stearate-based material may be 1.0 to 2.5% by weight based on a total weight of solids comprising the alkali-soluble resin, the metal stearate-based material, the initiator and the unsaturated ethylenic monomer, and the aqueous alkaline medium A pH of the aqueous alkaline medium may be 8 to 9.

Also, the adding of the unsaturated ethylenic monomer may be continuously performed for 60 to 180 minutes.

The metal stearate-based material may comprise one or more of zinc stearate, aluminum stearate, sodium stearate, magnesium stearate, and calcium stearate.

Also, the alkali-soluble resin may be a styrene/acrylic alkali-soluble resin having a weight average molecular weight of 5,000 to 30,000 g/mol, a glass transition temperature of 30 to 120° C., and an acid value of 70 to 180 mgKOH/g.

The details of other embodiments are included in the detailed description and the drawings.

Advantageous Effects

Since an emulsion according to an embodiment of the present disclosure exhibits improved sandability by itself, a separate additive is unnecessary and an emulsion having superior transparency and gloss can be provided.

In accordance with a method of preparing an emulsion according to an embodiment of the present disclosure, an emulsion exhibiting improved sandability by itself may be prepared and a process of subsequently adding a separate additive to improve sandability can be omitted, thereby simplifying a process.

The effects according to the embodiments of the present disclosure are not limited to those exemplified above and various other effects are provided herein.

MODES OF THE INVENTION

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

As used herein, the term "and/or" includes any and all combinations of one or more of the associated listed items. The numerical range indicated by using "to" represents a numerical range including the values described therebefore and thereafter as a lower limit and an upper limit, respectively. The term "about" or "approximately" means a value or numerical range within 20% of the value or numerical range described thereafter.

In the specification, the expression "alkali-soluble" refers to a property of being able to dissolve 10 g or more of a resin or a polymer in 1 L of deionized water at pH 7 or more at room temperature.

In the specification, the expression "emulsion" refers to a system wherein a particulate polymer insoluble in a dispersion medium is dispersed in a dispersion medium. The particulate polymer includes emulsion polymer particles or latex particles.

Hereinafter, an emulsion according to exemplary embodiments of the present disclosure and a method of preparing the emulsion are described in detail.

Emulsion

Figure 1:
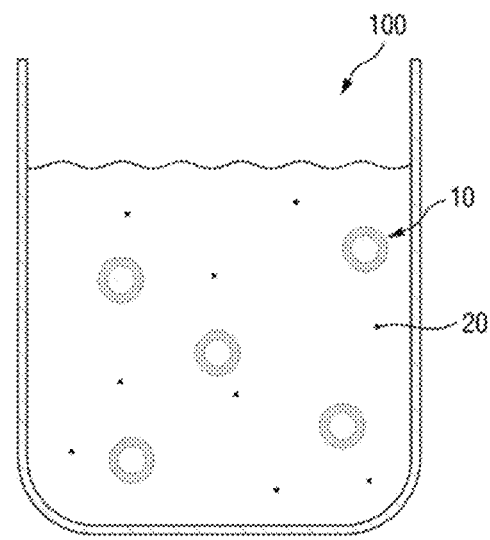
FIG. 1 is a schematic view illustrating an emulsion according to an embodiment of the present disclosure.
Figure 2:
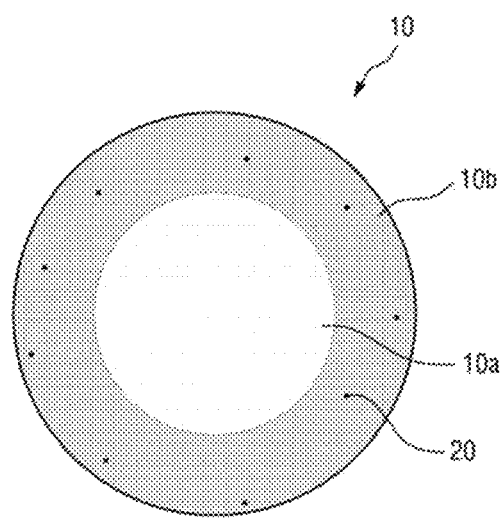
FIG. 2 is a schematic view illustrating a latex particle of FIG. 1.

FIG. 1 is a schematic view illustrating an emulsion according to an embodiment of the present disclosure. FIG. 2 is a schematic view illustrating a latex particle of FIG. 1.

Referring to FIGS. 1 and 2, an emulsion 100 according to an exemplary embodiment of the present disclosure includes latex particles 10 and a metal stearate-based material 20 dispersed in an aqueous medium.

The latex particles 10 may have at least a partial core-shell structure. A core portion 10a is formed of a polymer matrix, and a shell portion 10b may at least partially surround the core portion 10a. For example, the latex particles 10 may be prepared by emulsion-polymerizing monomers using an alkali-soluble resin as an emulsifier.

The core portion 10a may be formed of a polymer derived from an unsaturated ethylenic monomer. The polymer derived from an unsaturated ethylenic monomer may be formed by polymerization of monomers surrounded by an emulsifier during emulsion polymerization. The unsaturated ethylenic monomer may include a styrene-based monomer and/or a (meth)acrylic monomer. For example, the styrene-based monomer may be styrene(vinyl benzene), α-methyl styrene(isopropenyl benzene), β-methyl styrene(1-propenyl benzene), 4-methyl styrene(4-vinyl-1-methyl benzene), or 2,3-dimethyl styrene(1-ethenyl-2,3-dimethyl benzene), and the (meth)acrylic monomer may be methyl acrylate, ethyl acrylate, isopropyl acrylate, butyl acrylate, 2-ethylhexyl acrylate, glycidyl acrylate, hexanediol acrylate, methyl methacrylate, ethyl methacrylate, isopropyl methacrylate, butyl methacrylate, 2-ethylhexyl methacrylate, glycidyl methacrylate, or hexanediol methacrylate.

The shell portion 10b may be formed of an alkali-soluble resin. The alkali-soluble resin may be prepared by performing free-radical polymerization, e.g., continuous bulk polymerization, of styrene/acrylic monomers. For example, the alkali-soluble resin may be prepared by performing continuous bulk polymerization of a monomer composition that includes a monomer mixture including 20 to 35% by weight of a styrene-based monomer and 65 to 80% by weight of an acrylic monomer, a polymerization initiator and a solvent at 180 to 250° C.

In an exemplary embodiment, the alkali-soluble resin forming the shell portion 10b may have a weight average molecular weight (Mw) of about 5,000 to 30,000 g/mol and a glass transition temperature (Tg) of about 30 to 120° C. In addition, the alkali-soluble resin may have an acid value of about 70 to 180 mgKOH/g.

When the alkali-soluble resin has a weight average molecular weight, a glass transition temperature, and/or an acid value within these ranges, the emulsion 100 may have improved coating properties and sufficient durability. In particular, by configuring the alkali-soluble resin forming the shell portion 10b to have a weight average molecular weight higher than the polymer forming the core portion 10a, coating properties of the emulsion 100 may be reinforced. For example, when the emulsion 100 is used as a coating material, hardness and/or wettability of a coating film may be improved. In addition, as described below, when the molecular weight, etc. of the alkali-soluble resin used as an emulsifier is within a specific range to prepare an emulsion, dispersibility of the metal stearate-based material may be maximized, and stability of the prepared emulsion may be improved.

At least a portion of the metal stearate-based material 20 may be dispersed in an aqueous medium of the emulsion 100, and at least a portion of the metal stearate-based material 20 may be bound to the latex particles 10. For example, at least a portion of the metal stearate-based material 20 may be dispersed in the shell portion 10b of each of the latex particles 10. The metal stearate-based material 20 may be included in an amount of 1.0 to 2.5% by weight based on a total weight of the latex particles 10.

The metal stearate-based material 20 may include one or more of zinc stearate, aluminum stearate, sodium stearate, magnesium stearate, and calcium stearate.

Since the emulsion 100 according to the embodiment includes the metal stearate-based material 20, sandability of the emulsion 100 may be improved. In particular, since at least a portion of the metal stearate-based material 20 binds to the latex particles 10, the emulsion 100 itself may exhibit improved sandability.

That is, by imparting superior sandability to the emulsion 100, instead of subsequent addition of a separate additive to meet the required sandability, both sandability of the emulsion 100 and stability/dispersibility of the emulsion 100 may be accomplished. This could not be accomplished in conventional cases. In addition, since defects, such as phase separation and precipitation, do not occur even after a coating solution is prepared using the emulsion 100, superior storage stability may be provided. In addition, since the content of additives is minimized, transparency and gloss of the emulsion 100 and a coating film manufactured using the emulsion 100 may be improved. Further, by relatively lowering a glass transition temperature of the latex particles 10, the deterioration of film properties may be prevented and the content of a coalescent may be minimized.

Emulsion Preparation Method

The method of preparing an emulsion according to the embodiment includes a step of preparing an aqueous alkaline medium comprising an alkali-soluble resin dissolved therein; a step of adding a metal stearate-based material to the aqueous alkaline medium; a step of adding an unsaturated ethylenic monomer to the aqueous alkaline medium; and a step of emulsion-polymerizing the unsaturated ethylenic monomer in a state in which the metal stearate-based material is added.

A dispersion medium used for the emulsion polymerization may be an aqueous medium with basicity. For example, the aqueous alkaline medium may include water, e.g., ammonia, amines, potassium hydroxide, and/or sodium hydroxide dissolved in deionized water. The pH of the aqueous alkaline medium may be controlled considering intrinsic properties, such as viscosity and odor, etc. of the emulsion and required properties such as film properties, durability, and dispersibility. For example, the pH of the aqueous alkaline medium may be 7 to 10, or 8 to 9. By making the pH of the aqueous alkaline medium relatively high, superior dispersibility of the metal stearate-based material described below may be secured, whereby a highly transparent emulsion may be prepared.

The step of preparing an aqueous alkaline medium including an alkali-soluble resin dissolved therein may include a step of dispersing an alkali-soluble resin in an aqueous medium, e.g., deionized water, and then adding an alkaline material thereto, or a step of directly dissolving an alkali-soluble resin in an aqueous alkaline medium.

The alkali-soluble resin added to the aqueous alkaline medium may function similarly to an anionic emulsifier and may further secure stability due to entanglement of polymer chains thereof. The alkali-soluble resin is dissolved in the aqueous alkaline medium to form micelles, and unsaturated ethylenic monomers may be polymerized in a state of being surrounded by micelles. In addition, as described above, by using the alkali-soluble resin having the controlled weight average molecular weight, glass transition temperature, acid value, and the like as an emulsifier, latex particles may have a nanometer-scale average particle diameter and a narrow unimodal particle size distribution, thereby improving the gloss and transparency of a coating film.

In particular, since a separate anionic or non-ionic emulsifier, other than the alkali-soluble resin, is not used, storage stability of the emulsion is excellent, and dispersibility and stability of the metal stearate-based material, described below, may be secured.

For example, by using the alkali-soluble resin having the controlled weight average molecular weight, glass transition temperature, and/or acid value as an emulsifier, dispersibility of the metal stearate-based material and stability between polymerized latex particles are secured due to steric stabilization between the alkali-soluble resin and the metal stearate-based material and mechanical stability resulting from entanglement between the polymer chains, thereby forming a stabilized emulsion without phase separation or precipitation and maintaining the stabilized emulsion in a completely dispersed state. In other words, when the emulsion preparation method according to the embodiment wherein an alkali-soluble resin is used as an emulsifier is used, dispersibility of the metal stearate-based material may be maximized, compared to the case in which an additional anionic or non-ionic emulsifier, other than the alkali-soluble resin, is used. In addition, when the emulsion preparation method according to the embodiment wherein an alkali-soluble resin is used as an emulsifier is used, an emulsion state in which latex particles and additives are completely dispersed may be maintained, compared to the case in which an additional additive is used after the emulsion polymerization.

The metal stearate-based material may be added in a dispersion form or a powder form and may be dispersed in the aqueous medium. In addition, at least a portion of the metal stearate-based material may be dispersed between an entangled structure of the alkali-soluble resin dispersed in the aqueous medium. Here, the temperature of the aqueous medium may be about 45 to 60° C.

The metal stearate-based material may be added batchwise, or continuously or semi-continuously to further increase dispersibility. The metal stearate-based material may be added in a state in which the alkali-soluble resin is dispersed in the aqueous medium (i.e., a non-dissolved state) or in a state in which the alkali-soluble resin is dissolved in the aqueous alkaline medium to be solubilized therein.

The metal stearate-based material may be added in an amount of about 1.0 to 2.5% by weight based on a total weight of solids including the metal stearate-based material, the alkali-soluble resin, an initiator described below and an unsaturated ethylenic monomer described below, and the aqueous alkaline medium. That is, the metal stearate-based material may be added in an amount of about 1.0 to 2.5% by weight based on a total weight, of the reaction system. When the content of the metal stearate-based material is less than 1.0% by weight, a sufficient improvement of sandability might not be exhibited. When the content of the metal stearate-based material is greater than 2.5% by weight, the yield of the emulsion may be decreased or control of the latex particle size might not be easy, and durability may also be severely hindered due to insufficient dispersion.

The metal stearate-based material may include one or more of zinc stearate, aluminum stearate, sodium stearate, magnesium stearate, and calcium stearate.

In an exemplary embodiment, a step of stirring the aqueous medium including the metal stearate-based material added thereto and dispersed therein may be further included. A stirring time of the aqueous medium is not specifically limited and, for example, may be about 30 minutes or more so that the metal stearate-based material is sufficiently dispersed.

After the stirring step, a step of heating the aqueous alkaline medium and adding an initiator to the aqueous alkaline medium may be further included. The heating step of the aqueous alkaline medium may be a step of re-setting the temperature of the reaction system to the emulsion polymerization temperature. For example, the aqueous alkaline medium may be heated to about 70 to 90° C. The initiator may be added batchwise before reaction initiation or continuously or semi-continuously during the reaction considering polymerization stability, reactivity, and the like. The initiator used in the emulsion polymerization may be a persulfate-based initiator such as ammonium persulfate, potassium persulfate, or sodium persulfate.

The unsaturated ethylenic monomer may be added after addition of the metal stearate-based material. The unsaturated ethylenic monomer may include a styrene-based monomer and/or a (meth)acrylic monomer. Particular examples of the unsaturated ethylenic monomer have been described above, and thus, description thereof is omitted.

In some embodiments, the unsaturated ethylenic monomer may be added batchwise or continuously or semi-continuously considering polymerization stability. For example, the unsaturated ethylenic monomer may be continuously added over a period of about 60 to 180 minutes.

When the initiator and the unsaturated ethylenic monomer are added and, accordingly, emulsion polymerization is initiated, polymerization is performed in a state of being surrounded by micelles formed by the alkali-soluble resin dissolved in the aqueous medium, thereby forming core portions of latex particles. Accordingly, as described above, an emulsion including the latex particles including the core portion, which is derived from the polymer of unsaturated ethylenic monomers, and the shell portion, which surrounds the core portion and includes the alkali-soluble resin including the metal stearate-based material dispersed therein, may be prepared.

Hereinafter, the emulsion and the method of preparing the same according to an exemplary embodiment of the present disclosure are described in more detail with reference to preparation examples, comparative examples, and experimental examples.

PREPARATION EXAMPLES AND COMPARATIVE EXAMPLES: EMULSION PREPARATION

Preparation Example 1

A styrene/acrylic alkali-soluble resin having a weight average molecular weight of 12,000 g/mol and an acid value of 95 mgKOH/g was prepared. 88 g of the alkali-soluble resin was added to 576.2 g of deionized water contained in a 2 L glass reactor, and then 9.6 g of an aqueous ammonia solution was added thereto, followed by adjusting a temperature to 50° C. and a pH to about 8.5 and stirring for 90 minutes. In addition, 10 g of zinc stearate was added thereto batchwise, followed by stirring for 30 minutes. Subsequently, ammonium persulfate was continuously added thereto while elevating the temperature to 72° C. In addition, a monomer mixture including 194 g of styrene, 32 g of methyl methacrylate, 83 g of ethylhexyl acrylate, and 7.2 g of glycidyl methacrylate was continuously added thereto over a period of 150 minutes and emulsion polymerization was performed. As a result, an emulsion was prepared.

Preparation Example 2

An emulsion was prepared in the same manner as in Preparation Example 1, except that 15 g of zinc stearate was added.

Preparation Example 3

An emulsion was prepared in the same manner as in Preparation Example 1, except that 20 g of zinc stearate was added.

Preparation Example 4

An emulsion was prepared in the same manner as in Preparation Example 1, except that 25 g of zinc stearate was added.

Preparation Example 5

An emulsion was prepared in the same manner as in Preparation Example 1, except that 7.6 g of an aqueous ammonia solution was added to adjust the pH to about 7.0 and 20 g of zinc stearate was added.

Preparation Example 6

An emulsion was prepared in the same manner as in Preparation Example 5, except that 8.1 g of an aqueous ammonia solution was added to adjust the pH to about 7.5.

Preparation Example 7

An emulsion was prepared in the same manner as in Preparation Example 5, except that 8.8 g of an aqueous ammonia solution was added to adjust the pH to about 8.0.

Preparation Example 8

An emulsion was prepared in the same manner as in Preparation Example 5, except that 12.4 g of an aqueous ammonia solution was added to adjust the pH to about 9.0.

Preparation Example 9

A styrene/acrylic alkali-soluble resin having a weight average molecular weight of 12,000 g/mol and an acid value of 95 mgKOH/g was prepared. 88 g of the alkali-soluble resin, 9.6 g of an aqueous ammonia solution, and 20 g of zinc stearate were fed batchwise into 576.2 g of deionized water contained in a 2 L glass reactor, followed by adjusting a temperature to 50° C. and a pH to about 8.5 and stirring for 120 minutes. Subsequently, ammonium persulfate was continuously added thereto while elevating the temperature to 72° C. In addition, a monomer mixture including 194 g of styrene, 32 g of methyl methacrylate, 83 g of ethylhexyl acrylate, and 7.2 g of glycidyl methacrylate was continuously added thereto over a period of 150 minutes and emulsion polymerization was performed. As a result, an emulsion was prepared.

Comparative Example 1

A styrene/acrylic alkali-soluble resin having a weight average molecular weight of 12,000 g/mol and an acid value of 95 mgKOH/g was prepared. 88 g of the alkali-soluble resin was added to 576.2 g of deionized water contained in a 2 L glass reactor, and then 9.6 g of an aqueous ammonia solution was added thereto, followed by adjusting a temperature to 50° C. and a pH to about 8.5. In addition, ammonium persulfate was continuously added thereto while elevating the temperature to 72° C. In addition, a monomer mixture including 194 g of styrene, 32 g of methyl methacrylate, 83 g of ethylhexyl acrylate, and 7.2 g of glycidyl methacrylate was continuously added thereto over a period of 150 minutes and emulsion polymerization was performed. As a result, an emulsion was prepared.

Comparative Example 2

An emulsion was prepared in the same manner as in Preparation Example 1, except that 5 g of zinc stearate was added and stirring was performed for 30 minutes.

Comparative Example 3

An emulsion was prepared in the same manner as in Preparation Example 1, except that 30 g of zinc stearate was added and stirring was performed for 30 minutes.

Comparative Example 4

20 g of zinc stearate was added while stirring the emulsion prepared according to Comparative Example 1, thereby preparing an emulsion to which zinc stearate has been subsequently added.

Comparative Example 5

25 g of zinc stearate was added while stirring the emulsion prepared according to Comparative Example 1, thereby preparing an emulsion to which zinc stearate has been subsequently added.

Comparative Example 6

0.08 g of a silicone-based slip agent (Dow Corning 51) was added while stirring 100 g of the emulsion prepared according to Comparative Example 1, thereby preparing an emulsion to which a silicone-based additive has been subsequently added.

Comparative Example 7

0.1 g of a silicone-based slip agent (Dow Corning 51) was added while stirring 100 g of the emulsion prepared according to Comparative Example 1, thereby preparing an emulsion to which a silicone-based additive has been subsequently added.

EXPERIMENTAL EXAMPLES

Experimental Example 1: Sandability Evaluation

The emulsion prepared according to each of Preparation Examples 1 to 9 and Comparative Examples 1 to 7 was applied to a thickness of 100 μm on a wooden plate once and then was dried for one hour at 25° C., followed by being sanded with 600 grit sandpaper for 20 seconds. Aggregation degrees of resultant products and the amounts of generated dust were compared with each other. Results are summarized in Table 1.

Experimental Example 2: Stability Evaluation

The emulsion prepared according to each of Preparation Examples 1 to 9 and Comparative Examples 1 to 7 was contained in a vial in the same amount. Subsequently, periods (days) taken until the same amount of precipitate was generated in each of the emulsions were compared with each other. Results are summarized in Table 1.

Experimental Example 3: Gloss Evaluation

The emulsion prepared according to each of Preparation Examples 1 to 9 and Comparative Examples 1 to 7 was applied to a thickness of 50 μm on an opacity chart once. Subsequently, gloss was measured at a 60° reflection angle by means of a gloss meter (model name: BYK Gardner 4431 micro-TRI-gloss) and compared with each other. Results are summarized in Table 1.

Experimental Example 4: Film Properties Evaluation 100 g of the emulsion prepared according to each of Preparation Examples 1 to 9 and Comparative Examples 1 to 7 was mixed with a coalescent (DPM/DPnB=1/1). A wooden plate was spray-coated with a resultant mixture to a thickness of 100 μm, followed by drying at 25° C. Under these conditions, a minimum content of the coalescent allowing coating film formation without crack generation in the coating film was measured. Results are summarized in Table 1.

Experimental Example 5: Hardness Evaluation

The emulsion prepared according to each of Preparation Examples 1 to 9 and Comparative Examples 1 to 7 was applied to a thickness of 100 μm on a glass substrate, followed by drying at 50° C. for 24 hours. Subsequently, hardness was measured by means of a pendulum hardness tester (model name: SP-SP0500) and a pencil hardness tester (model name: KP-M5000M). Results are summarized in Table 1.

Experimental Example 6: Water Resistance Evaluation

The emulsion prepared according to each of Preparation Examples 1 to 9 and Comparative Examples 1 to 7 was applied to a thickness of 100 μm on a wooden plate once, followed by drying at 25° C. for one hour and sanding with 600 grit sandpaper for 20 seconds. In addition, the wooden plate was further coated with the emulsion to a thickness of 100 μm once, followed by drying at 25° C. for seven days. Subsequently, cotton, which was sufficiently wetted with water, was placed on the wooden plate and then allowed to sit for 24 hours under a humid condition. Subsequently, the cotton was removed and whether or not the coating film was damaged was observed. Results are summarized in Table 1.

Experimental Example 7: Alcohol Resistance Evaluation

The emulsion prepared according to each of Preparation Examples 1 to 9 and Comparative Examples 1 to 7 was applied to a thickness of 100 μm on a wooden plate once, followed by drying at 25° C. for one hour and sanding with 600 grit sandpaper for 20 seconds. In addition, the wooden plate was further coated with the emulsion to a thickness of 100 μm once, followed by drying at 25° C. for seven days. Subsequently, cotton, which was sufficiently wetted with 50% ethanol, was placed on the wooden plate and then allowed to sit for one hour. Subsequently, the cotton was removed and whether or not the coating film was damaged was observed. Results are summarized in Table 1.

TABLE 1

| | Conversion rate (%) | Sandability evaluation | Stability evaluation (days) | Gloss evaluation | Film properties evaluation (parts by weight) | Pendulum hardness (sec) | Pencil hardness | Water resistance evaluation | Alcohol resistance evaluation |
|---|---|---|---|---|---|---|---|---|---|
| Preparation Example 1 | 99.0 | B+ | 21~ | 88.7 | 6 | 129.7 | 1B-HB | ○ | ○ |
| Preparation Example 2 | 98.9 | B+ | 16~20 | 88.7 | 6 | 132.4 | HB | ○ | ○ |
| Preparation Example 3 | 99.1 | A | 16~20 | 88.6 | 6 | 140.2 | HB-1H | ○ | ○ |
| Preparation Example 4 | 99.0 | A | 11~15 | 87.4 | 6 | 141.1 | HB-1H | ○ | ○ |
| Preparation Example 5 | 98.8 | B+ | 11~15 | 88.1 | 6 | 135.0 | HB | ○ | ○ |
| Preparation Example 6 | 99.0 | A− | 16~20 | 88.3 | 6 | 135.4 | HB | ○ | ○ |
| Preparation Example 7 | 99.0 | A | 21~ | 88.4 | 6 | 137.9 | HB-1H | ○ | ○ |
| Preparation Example 8 | 99.1 | A+ | 21~ | 88.9 | 6 | 141.7 | 1H | ○ | ○ |
| Preparation Example 9 | 98.7 | B | 5~10 | 86.7 | 6 | 133.6 | HB | ○ | Δ |
| Comparative Example 1 | 99.1 | B− | 21~ | 89.0 | 6 | 121.4 | 1B-HB | ○ | ○ |
| Comparative Example 2 | 99.3 | B− | 21~ | 88.9 | 6 | 122.1 | 1B-HB | ○ | ○ |
| Comparative Example 3 | 99.0 | A | 5~10 | 78.7 | 6 | 125.3 | — | ○ | X |
| Comparative Example 4 | 99.1 | A− | 5~10 | 85.2 | 6 | 133.5 | 1B-HB | ○ | Δ |
| Comparative Example 5 | 99.1 | A | 5~10 | 84.8 | 6 | 122.6 | 1B-HB | ○ | Δ |
| Comparative Example 6 | 99.1 | A− | 21~ | 81.5 | 6 | 122.3 | HB | ○ | ○ |
| Comparative Example 7 | 99.1 | A | 21~ | 80.1 | 6 | 121.9 | HB | ○ | ○ |

In Table 1, regarding "sandability evaluation," the amount of dust increases and aggregation is decreased from B to A+, and B− indicates a non-sanded state. In addition, regarding "hardness evaluation," pendulum hardness is better as time (sec) increases, and pencil hardness is superior in an order of 1H>HB>1B>2B. In addition, regarding "water resistance evaluation" and "alcohol resistance evaluation," ○ indicates a level wherein clouding does not occur or, although clouding instantaneously occurs, a coating film is completely recovered, Δ indicates a case wherein only a few marks are formed on a coating film, and x indicates a case wherein a film is broken.

Referring to Table 1, it can be confirmed that, while the emulsion according to Comparative Example 1 polymerized under the same conditions is not sanded, the emulsions according to Preparation Examples 1 to 9 exhibit improved sandability.

In addition, in the case of Comparative Example 3, the stearate-based material was not satisfactorily dispersed, thereby exhibiting a severe property variation. In particular, it was difficult to measure pencil hardness.

In addition, it can be confirmed that, whereas the emulsions according to Comparative Examples 4 and 5 wherein the metal stearate-based material was added after emulsion formation exhibit very poor stability and low hardness, the emulsions according to Preparation Examples 1 to 9 exhibit relatively superior stability and improved hardness.

In addition, it can be confirmed that, whereas the emulsions according to Comparative Examples 6 and 7, to which the silicone-based additive was added exhibit a significant decrease in film gloss and clarity, the emulsion according to Preparation Examples 1 to 9 exhibit superior gloss.

Further, it can be confirmed that the emulsions according to Preparation Examples 1 to 9 have sufficient film properties despite the addition of the stearate-based material.

In conclusion, the emulsion preparation method and the emulsion prepared thereby according to the embodiment provide superior durability such as hardness, water resistance, and alcohol resistance, without deteriorating film gloss, film properties, and emulsion storage stability, while maximizing a sandability improvement effect due to the inclusion of the metal stearate-based material.

While this disclosure has been particularly shown and described with reference to embodiments thereof, it will be understood by those skilled in the art that this disclosure is not limited to the embodiments and various changes in form and details may be made therein without departing from the spirit and scope of the invention. For example, each component particularly described in the embodiments of the present disclosure may be modified. In addition, it should be understood that such modifications and applications are to be construed as being within the scope of the present disclosure as defined by the appended claims.

The invention claimed is:

1. An emulsion, comprising:
   styrene/acrylic latex particles comprising a core portion including a polymer matrix polymerized by an unsaturated ethylenic monomer, and a shell portion which surrounds the core portion and including alkali-soluble resin, wherein the alkali-soluble resin is prepared by performing free-radical polymerization of styrene/acrylic monomers; and a metal stearate-based material is present in an amount of 1.0 to 2.5% by weight based on a total weight of the emulsion, and at least a portion of the metal stearate-based material is dispersed in the shell portion of the latex particles.

2. The emulsion according to claim 1, wherein the metal stearate-based material comprises one or more of zinc stearate, aluminum stearate, sodium stearate, magnesium stearate, and calcium stearate.

* * * * *